(12) United States Patent
Chan et al.

(10) Patent No.: US 7,359,313 B2
(45) Date of Patent: Apr. 15, 2008

(54) SPACE-TIME BIT-INTERLEAVED CODED MODULATION FOR WIDEBAND TRANSMISSION

(75) Inventors: Albert Chan, Cambridge, MA (US); Inkyu Lee, Kearny, NJ (US); Carl-Erik Wilhelm Sundberg, Chatham, NJ (US)

(73) Assignee: Agere Systems Inc., Allentown, PA (US)

( * ) Notice: Subject to any disclaimer, the term of this patent is extended or adjusted under 35 U.S.C. 154(b) by 909 days.

(21) Appl. No.: 10/178,923

(22) Filed: Jun. 24, 2002

(65) Prior Publication Data

US 2003/0235149 A1 Dec. 25, 2003

(51) Int. Cl.
*H04J 11/00* (2006.01)

(52) U.S. Cl. .................................... 370/210

(58) Field of Classification Search ................ None
See application file for complete search history.

(56) References Cited

U.S. PATENT DOCUMENTS

| | | | |
|---|---|---|---|
| 6,144,711 A | 11/2000 | Raleigh et al. | 375/347 |
| 6,952,454 B1* | 10/2005 | Jalali et al. | 375/260 |
| 6,985,434 B2 | 1/2006 | Wu et al. | 370/208 |
| 7,046,740 B2* | 5/2006 | Dowling | 375/296 |
| 2001/0053143 A1 | 12/2001 | Li et al. | 370/344 |
| 2002/0131516 A1 | 9/2002 | El-Gamal et al. | 375/285 |
| 2002/0141508 A1 | 10/2002 | El-Gamal et al. | 375/267 |
| 2002/0154705 A1 | 10/2002 | Walton et al. | 375/267 |
| 2002/0165626 A1 | 11/2002 | Hammons, Jr. et al. | 700/53 |
| 2003/0103584 A1* | 6/2003 | Bjerke et al. | 375/340 |

OTHER PUBLICATIONS

"Lattice Code Decoder for Space-Time Codes" by Oussama Damen, etal; IEEE Communications Letters, vol. 4, No. 5, May 2000.
"Space-Time Bit-Interleaved Coded Modulation With An Iterative Decoding Strategy" by Andrea M. Tonello; Proceedings, VTC 2000 Fall, Boston, MA, Sep. 2000, pp. 473-478.

* cited by examiner

*Primary Examiner*—Duc Ho
(74) *Attorney, Agent, or Firm*—Steve Mendelsohn; Kevin M. Drucker

(57) ABSTRACT

A system employs space-time coding characterized at the transmitter by bit-interleaved coded modulation (BICM) combined with multi-carrier Orthogonal Frequency Division Multiplexing (OFDM) modulation. Space-Time coding techniques improve transmission efficiency in radio channels by using multiple transmit and/or receive antennas and coordination of the signaling over these antennas. Bit-interleaved coded modulation provides good diversity gain with higher-order modulation schemes that employ binary convolutional codes. OFDM modulation allows for wideband transmission over frequency selective radio channels. A receiver demodulates the OFDM signal and applies multi-input, multi-output (MIMO) demapping to estimate the BICM encoded bitstream. After deinterleaving of the BICM encoded bitstream, maximum a posteriori (MAP) decoding is applied to the resulting bit stream to generate soft output values. The MIMO demapping and MAP decoding processes exchange likelihood information to improve the bit error rate performance over several iterations of demapping/decoding. By applying well-known turbo-decoding principles to iteratively demap and decode, the overall receiver performance is significantly improved.

34 Claims, 4 Drawing Sheets

SPACE-TIME BIT-INTERLEAVED CODED MODULATION FOR WIDEBAND TRANSMISSION

BACKGROUND OF THE INVENTION

1. Field of the Invention

The present invention relates to data modulation and demodulation in a communication network, and, more particularly, to space-time coding and decoding techniques for wideband data channels.

2. Description of the Related Art

Wireless channels exhibit a number of impairments, among which fading is one of the most severe. For narrowband channels, the fading can often be assumed to be flat, while for wideband channels the fading is typically frequency selective. In addition, additive noise and interference contribute significantly to signal degradation. Diversity is a method to improve transmission over fading channels. Time diversity uses encoding to duplicate and spread information through an encoded bit stream (e.g., convolutional encoding) and space diversity employs multiple transmit and/or receive links to duplicate and spread information over multiple signal paths.

Coded modulation systems employ methods that utilize time diversity. Encoded data is transmitted through the path between a single transmit antenna and a single receive antenna. Some methods efficiently utilize binary convolutional codes to obtain diversity gains with higher-order, non-binary modulation symbols (e.g., 16-QAM), such as bit-interleaved coded modulation (BICM) systems using multi-level coding methods (and corresponding multistage decoding at the receiver). For example, BICM systems provide diversity gains, and, for example, higher-order, coded modulation systems use well-known binary convolutional codes separated by interleaving to encode the data. Further improvements in system performance are obtained by iterative demapping (translation of symbols to bits) and decoding at the receiver. More recently, so-called space-time coding methods have been proposed to obtain both space and time diversity by using multiple transmit and/or receive antennas along with matching coding. For example, a space-time BICM scheme for narrowband radio channels employing multiple transmit antennas in flat fading cases is described in A. M. Tonello, "Space-Time Bit-Interleaved Coded Modulation With An Iterative Decoding Strategy," Proceedings, VTC 2000 Fall, Boston, Mass., September 2000, pp. 473-478, which is incorporated herein in its entirety by reference.

Orthogonal Frequency Division Multiplexing (OFDM) is a form of data transmission in which a block of data is converted into a parallel form and mapped into frequency domain symbols. To generate a time domain signal for transmission over the antenna link between antennas, the inverse discrete Fourier transform (IDFT, or its fast version, the IFFT) of length F is applied to F frequency domain symbols to create F subchannels (also known as F subcarriers, since each channel is a separately modulated carrier). Each of the F subcarriers is orthogonal to each other while the frequency spectrum overlaps. The frequency spacing between the F subcarriers is minimum in OFDM, giving OFDM high spectral efficiency. At the receiver, the discrete Fourier transform (DFT, or its fast version, the FFT) is applied to the received signal over F subchannels to generate a sequence of values representing estimated frequency domain symbols. Demapping maps the estimated symbols back to the original block of user data (bits). OFDM allows for wideband transmission over frequency selective (radio) channels without adaptive equalizers. For wideband systems, OFDM has been proposed for a wide range of radio channel applications. One application is the wireless Local Area Network (LAN) system defined by the IEEE 802.11a standard. This standard adopts OFDM in packet-based communications operating in unlicensed 5-GHz bands.

SUMMARY OF THE INVENTION

In accordance with embodiments of the present invention, a system employs space-time coding characterized at the transmitter by coded modulation, such as bit-interleaved coded modulation (BICM), combined with Orthogonal Frequency Division Multiplexing (OFDM) over multiple transmit and/or receive antennas. A receiver demodulates the OFDM signal and applies multi-input, multi-output (MIMO) demapping to estimate the BICM encoded bitstream. After deinterleaving of the estimated BICM encoded bitstream, maximum a posteriori (MAP) decoding is applied to the resulting bit stream to generate soft output values for decoded user data. The MIMO demapping and MAP decoding processes exchange likelihood information to improve the bit error rate performance over several iterations of demapping/decoding.

In accordance with an exemplary embodiment of the present invention data is processed for transmission through a channel by (a) applying coded modulation to the data to generate an encoded bitstream; (b) forming at least two parallel streams from the encoded bitstream; (c) modulating each parallel stream to form a corresponding sequence of frequency domain symbols; and (d) transforming, for each parallel steam, F frequency domain symbols into F subchannels, wherein F is an integer greater than 1.

In accordance with another exemplary embodiment of the present invention, data is generated from two or more groups of F subchannels. A subchannel of each group is applied to a corresponding multi-input, multi-output (MIMO) demapper; and each MIMO demapper generates 1) a corresponding estimate of two or more parallel streams and 2) likelihood information based on extrinsic information. The estimates of the two or more parallel streams are combined into an estimate of an encoded bitstream that is decoded based on the likelihood information, wherein the decoding generates the extrinsic information.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
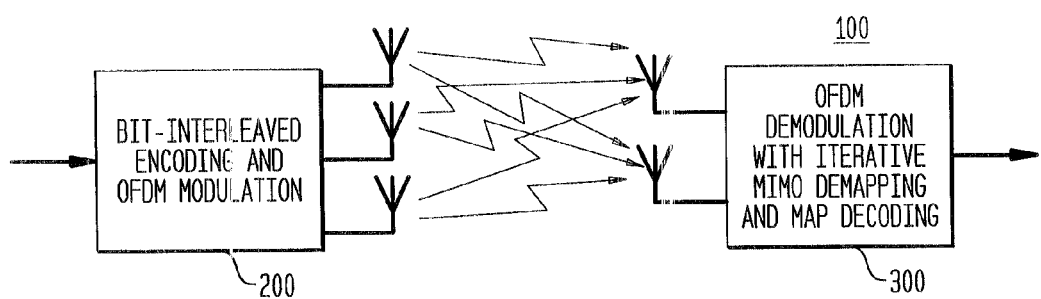
FIG. 1 shows a coded modulation system employing one or more embodiments of the present invention.

FIG. 1 shows a coded modulation system 100 employing one or more embodiments of the present invention. Coded modulation system 100 is characterized by transmitter 200 applying space-time coding with bit-interleaved coded modulation that is combined with a multi-carrier OFDM modulation; and receiver 300 applying OFDM demodulation with iterative demapping and decoding. Such coded modulation systems in accordance with the present invention may be advantageously employed in wireless local/wide area network (LAN/WAN) applications.

FIG. 1 shows an example of a system with 3 transmit antennas and 2 receive antennas. In general, system 100 has $N_t$ transmit antennas and $N_r$ receive antennas. While the exemplary embodiment is described for space-time coding with bit-interleaved coded modulation, other types of coded modulation for space-time coding may be employed. In addition, the exemplary embodiments are described for a mapping of the bit-interleaved coded data into symbols using a modem constellation. Such modem constellation may be m-ary PSK or m-ary QAM with m constellation points, though the present invention is not limited to these constellations and may employ any multi-level signal point modulation. System 100 employs OFDM for wideband channels using F subcarriers rather than single carrier modems. The spectral efficiency of system 100 is $R_C \cdot N_t \cdot \log_2 m$ bits/s/Hz, where $R_C$ is the rate of the convolutional code used.

Figure 2:
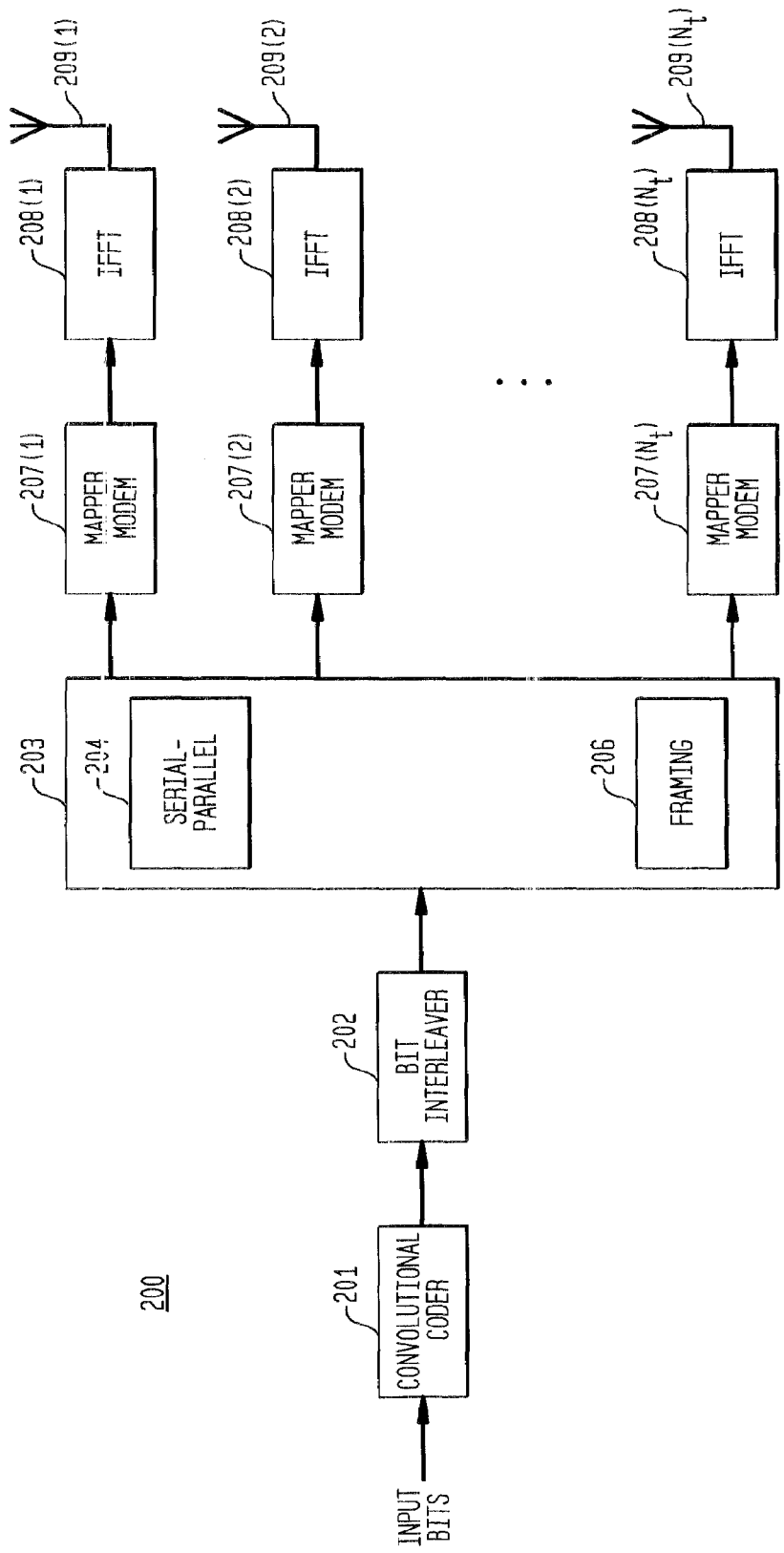
FIG. 2 shows an exemplary embodiment of the transmitter shown in FIG. 1.

FIG. 2 shows transmitter 200 for space-time coding with bit-interleaved coded modulation (BICM) with OFDM modulation for the case of wideband frequency selective channels. Transmitter 200 comprises convolutional encoder 201, bit interleaver 202, processing module 203, mapper modems 207(1)-207($N_t$), inverse fast Fourier transform (IFFT) modules 208(1)-208($N_t$), and transmit antennas 209(1)-209($N_t$).

Applying BICM encoding to the data is as follows. Convolutional coder 201 applies a binary convolutional code with rate $R_C$ to the input bits (input data). Bit interleaver 202 then interleaves the encoded bits from convolutional coder 201 to generate BICM encoded data. Bit interleaving by interleaver 202 de-correlates the fading channel, maximizes diversity, removes correlation in the sequence of convolutionally encoded bits from convolutional coder 201, and conditions the data for increased performance of iterative decoding. Convolutional coder 201 and bit interleaver 202 may typically operate on distinct blocks of input data, such as data packets.

Applying OFDM to the BICM encoded data is as follows. Processing module 203 includes serial-to-parallel converter 204 and optional framing module 206. Serial-to-parallel converter 204 receives the serial BICM encoded bitstream from bit interleaver 202, which bitstream may have framing information inserted in the bitstream by framing module 206. Optional framing information allows a receiver to synchronize its decoding on distinct blocks of information. Serial-to-parallel converter 204 generates a word of length $N_t$, with each element of the word provided to a corresponding one of mapper modems 207(1)-207($N_t$). Elements of the word may be single-bit values or may be b-bit values where b is the number of bits represented by each modem constellation symbol.

Mapper modems 207(1)-207($N_t$) each convert b bits to corresponding symbols (of the m-ary symbol space) in the sequence $x_k^i$ of equation (5), described below. The output of the $i^{th}$ modem mapper 207($i$) is a symbol. Each IFFT module 208($i$) each collects up to F symbols and then applies the IFFT operation of length F to the block of F symbols. Thus, each IFFT modules 208($i$) generates F parallel subchannels that may be transmitted over a corresponding antenna 209($i$). Each subchannel is a modulated subcarrier that is transmitted over the channel.

Figure 3:
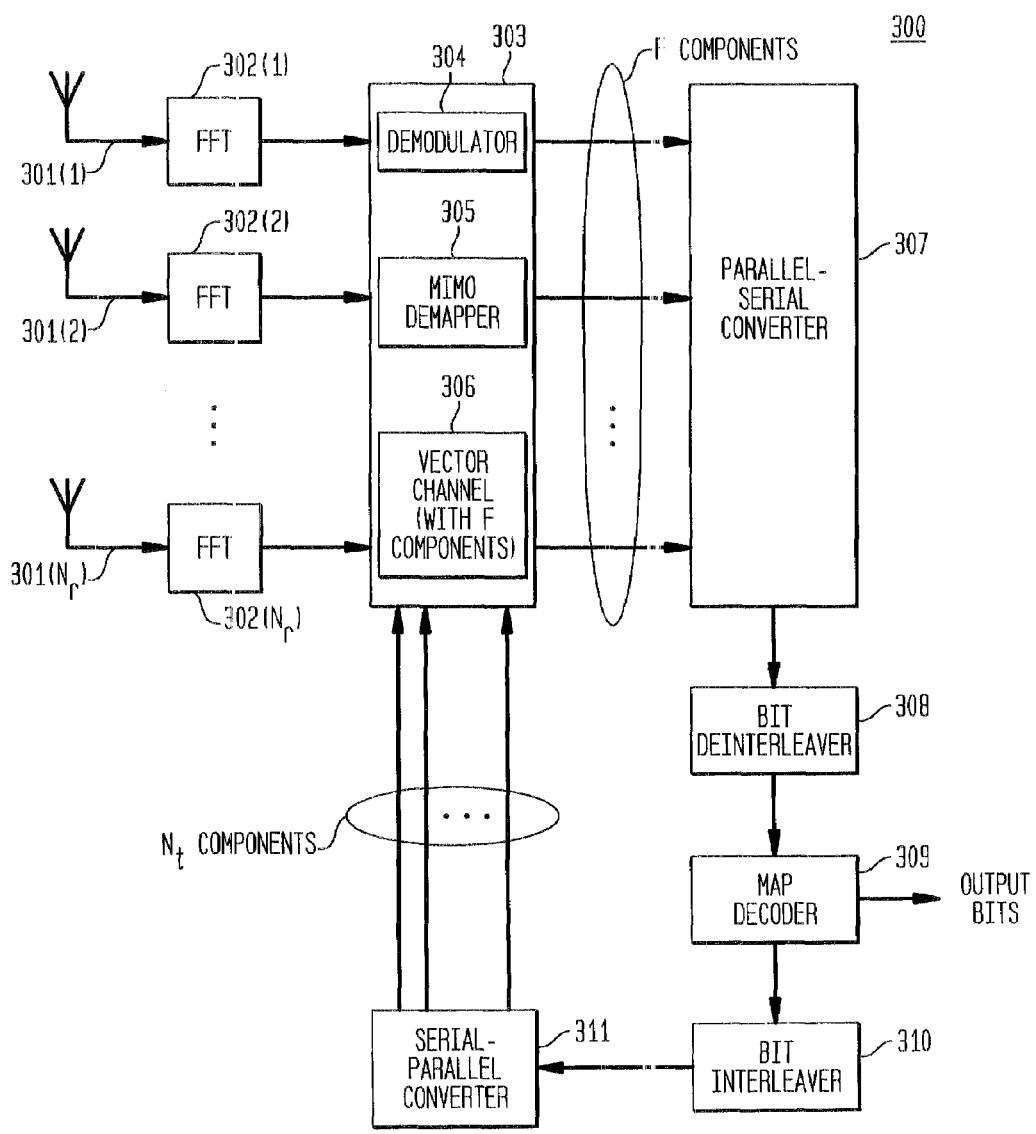
FIG. 3 shows an exemplary embodiment of the receiver shown in FIG. 1.

FIG. 3 shows receiver 300 as an iterative decoder for the space-time code for the OFDM system. Receiver 300 comprises receive antennas 301(1)-301($N_r$), fast Fourier transform (FFT) modules 302(1)-302($N_r$), demodulator/detector 303, parallel-to-serial converter 307, bit deinterleaver 308, maximum a posteriori (MAP) decoder 309, bit interleaver 310, and serial-to-parallel converter 311.

A system model may be defined for the general case of $N_t$ transmit antennas ($N_t$ an integer and $N_t \geq 2$) and $N_r$ receive antennas ($N_r$ an integer and $N_r \geq 1$). Each of the $N_r$ receive antennas receives signals from the $N_t$ transmit antennas. The output $y_{k,l}^j$ at the kth subcarrier and at the lth time slot from the jth receive antenna matched filter after the discrete Fourier transform (DFT, or its fast version, the FFT) is given by equation (1):

$$y_{k,l}^j = \sqrt{E_s} \sum_{i}^{N_t} H_{k,l}^{i,j} x_{k,l}^i + n_{k,l}^j \text{ for } j = 1, 2, \ldots N_r \tag{1}$$

where $x_{k,l}^i$ is the transmitted symbol (of a multi-level symbol constellation) at the ith transmit antenna at the kth subcarrier and at the lth time slot. The value $E_s$ is defined as the symbol energy and $H_{k,l}^{i,j}$ is defined as the equivalent channel frequency response of the link between the ith transmit antenna and jth receive antenna at the kth subcarrier and at the lth time slot. The quantity $n_{k,l}^j$ represents the additive noise contribution, which is represented as a sequence of i.i.d. complex, zero-mean, Gaussian variables with variance $N_o/2$ per dimension ($N_o$ being the noise power).

The time domain channel impulse response between the ith transmit and jth receive antenna may be a frequency selective channel that may be modeled as defined in equation (2):

$$h^{i,j}(t, \tau) = \sum_{n=1}^{K} \overline{h}^{i,j}(n, t)\delta(\tau - \tau_n) \tag{2}$$

where the channel coefficients $\overline{h}^{i,j}(n,t)$ are complex Gaussian variables with zero mean (Rayleigh fading). The term $\delta(\cdot)$ is defined as the Dirac delta function, t is the time base, $\tau$ is a delay and K denotes the number of channel (filter) taps.

The channel impulse responses of each of the antenna links are independent of one another. Both fast fading (i.e., uncorrelated fading coefficients in time) and block fading (i.e. static fading coefficients over a block of transmitted symbols, independent over blocks) may be present. For the described embodiments, the model is described using block fading typical of wireless LANs with slow movements. Consequently, the variables with respect to time indices l and t may be considered constant and these indices are omitted from the following description for clarity.

The channel frequency response in equation (1) may be expressed as given in equation (3):

$$H_k^{i,j} = \sum_{n=1}^{K} \overline{h}^{i,j}(n) e^{-j2\pi k \tau_n / FT} \tag{3}$$

where T denotes the sampling period. The absolute magnitude of the channel frequency response, $|H_k^{i,j}|$, is Rayleigh distributed.

The symbol constellation is normalized such that equation (4) holds true:

$$E\{|x_k^i|^2\}=1 \text{ for } i=1,2,\ldots N_t \quad (4)$$

With vector notations, equation (2) may be expressed as in equation (5):

$$y_k = \begin{bmatrix} y_k^1 \\ \vdots \\ y_k^{N_T} \end{bmatrix} = \sqrt{E_s} \begin{bmatrix} H_k^{1,1} & \cdots & H_k^{N_t,1} \\ \vdots & \ddots & \vdots \\ H_k^{1,N_T} & \cdots & H_k^{N_t,N_T} \end{bmatrix} \begin{bmatrix} x_k^1 \\ \vdots \\ x_k^{N_t} \end{bmatrix} + \begin{bmatrix} n_k^1 \\ \vdots \\ n_k^{N_T} \end{bmatrix} \quad (5)$$

or equivalently as in equation (5'):

$$y_k = \sqrt{E_s} H_k x_k + n_k \text{ for } k=1,2,\ldots F \quad (5')$$

Generally, receiver 300 includes circuitry that estimates the values for the elements in channel response matrix $H_k$, and such estimates may be generated using periodic test signals transmitted by transmitter 200 to receiver 300. Such a priori information of the channel impulse response may also be generated via simulations.

For a wideband system, receiver 300 performs OFDM demodulation for each of receive antennas 301(1)-301($N_r$), where the demodulation and demapping is performed over F parallel subchannels. The jth receive antenna 301(j) senses a signal made up of various contributions of the signals transmitted from the $N_t$ transmit antennas (i.e., contributions of the multiple F parallel, narrowband, flat fading subchannels transmitted over corresponding antennas 209(1)-209($N_t$) of FIG. 2). Each FFT module 302(j) applies an F-point FFT to the signals from corresponding receive antenna 301(j). As such, the $N_r$ FFT modules generate $N_r$ parallel sets of F subchannels.

In accordance with embodiments of the present invention, demodulator/detector 303 estimates bits in each of the F subchannels (slowly varying with flat fading) rather than in only one subchannel as in the narrowband, flat fading systems of the prior art. Demodulator 304 demodulates F subchannel carriers to baseband for each of the $N_r$ parallel sets of F subchannels. Multi-input multi-output (MIMO) demapper 305, based on the $N_r$ parallel sets of F subchannels from FFT modules 302(1)-302($N_r$) produces MAP estimates of the demapped bits (i.e, bits mapped from the constellation symbol) in each of the F subchannels from the $N_t$ antennas in the transmitter. MIMO demapper 305 produces the MAP estimates of the demapped bits using reliability information generated by MAP decoder 309, which the MAP decodes the MAP estimates of the BICM values to generate either soft decisions during first and subsequent iterations or user data during the last iteration.

Estimation of bit values by MIMO demapper 305 is now described. MIMO demapper 305 computes soft values for bits transmitted on the overlapping F subchannels, along with an a posteriori probability of the soft value being correct. The a posteriori probability of the soft value is defined as an a posteriori log-likelihood ratio (LLR) for the soft value (bit). Defining $d_k^{i,m}$ as the bit that is mapped at the kth subcarrier into the mth bit position (m=1, 2 ... M, where M is the integer number of bits per symbol) of the constellation symbol of the ith transmit antenna, i=1, 2, ... $N_t$, then the a posteriori LLR L ($d_k^{i,m}$) for the soft value corresponding to bit $d_k^{i,m}$ is given as in equation (6):

$$L(d_k^{i,m}) = \log\frac{P(d_k^{i,m} = +1)}{P(d_k^{i,m} = -1)}. \quad (6)$$

The set $S_d^{i,m}$, d=+1 or −1, is defined as the set of all symbol vectors with a +1 or −1 value for bit $d_k^{i,m}$, respectively. The number of elements in such a set is $2^{N_tM}$. The LLR in equation (6) conditioned on the channel state information $H_k$ is given in equation (7):

$$\log\frac{P(d_k^{i,m} = +1 \mid y_k, H_k)}{P(d_k^{i,m} = -1 \mid y_k, H_k)} = \log\frac{\sum_{x_k \in S_{+1}^{i,m}} p(x_k, y_k, H_k)}{\sum_{x_k \in S_{-1}^{i,m}} p(x_k, y_k, H_k)} \quad (7)$$

A MIMO demapper considers all $2^{N_tM}$ combinations of overlapping bits in a subchannel and then evaluates the LLR for each combination. For system 100, the complexity (number of combinations evaluated) is approximately $2^{N_tM}$. Thus, assuming a transmitted vector of symbol bits $x_k$ a vector of observations at the receiver $y_k$, and the known estimated channel function $H_k$, the soft output values for bits may be generated by calculating the LLR of equation (7) for all combinations.

Figure 4:
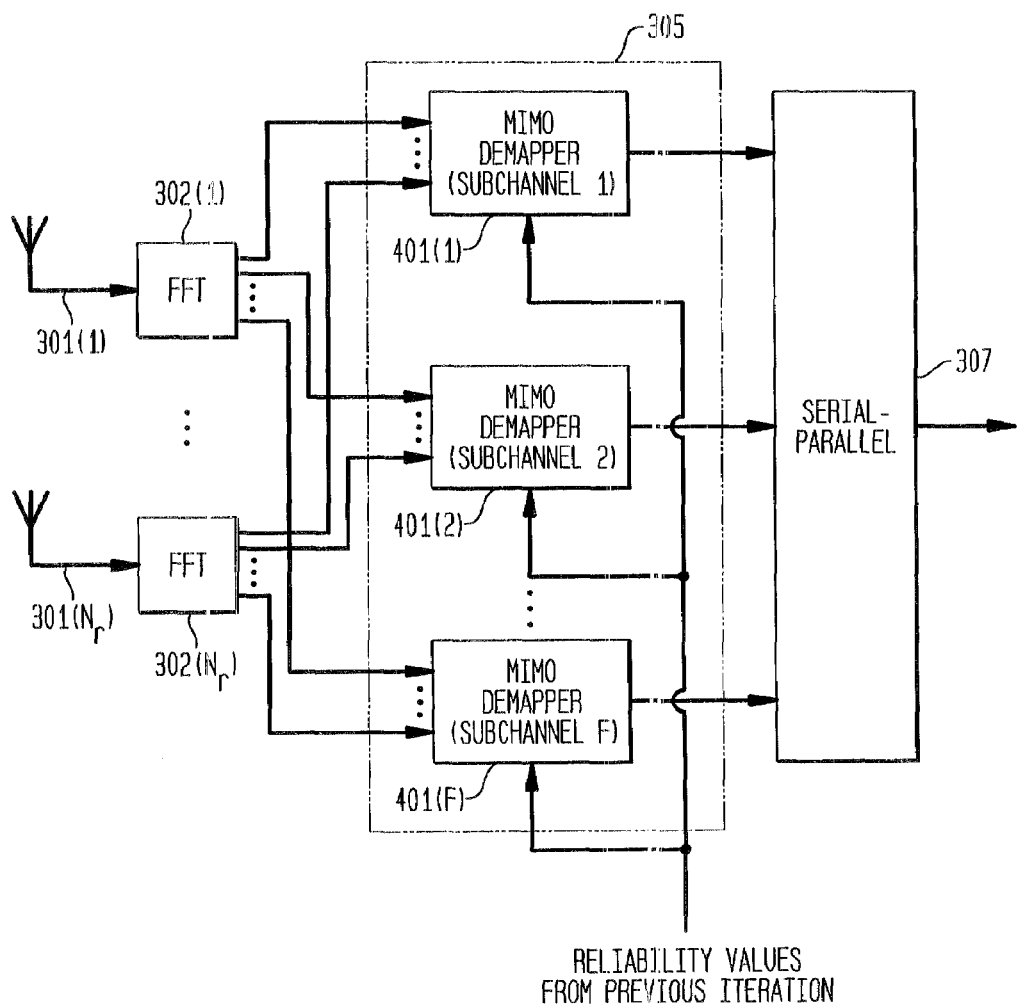
FIG. 4 shows an exemplary embodiment of the multi-input, multi-output (MIMO) demapper shown in FIG. 3.

MIMO demapper 305 in FIG. 3 is shown in FIG. 4. Each signal of the $N_r$ receive antennas 302(1)-302($N_r$) is divided into F subchannels (via demodulator 304, not shown in FIG. 4) by applying the FFT and sent to corresponding subchannel MIMO demappers 401(1)-401(F). The signal outputs of the kth subchannel for all $N_r$ receive antennas are provided to the kth subchannel MIMO demapper 401(k), which computes the log likelihood ratio of equation (7) using extrinsic information (a likelihood ratio vector $L_k^e$) generated from the output of MAP decoder 309 of the previous iteration. Instead of the parallel structure shown in FIG. 4, it is possible to process the signals output from each of FFT modules 302(1)-302($N_r$) sequentially by buffering the output and processing them one by one with only one MIMO demapper.

In order to generate a value for the LLR of equation (7), the joint probability density $p(x_k,y_k,H_k)$ of equation (7) is evaluated. The joint probability density $p(x_k,y_k,H_k)$ of equation (7) is proportional to ($\propto$) the quantity of equation (8):

$$p(x_k, y_k, H_k) \propto \exp\left(-\frac{1}{N_0}\|y_k - H_k x_k\|^2 + \frac{1}{2}d_k^T L_k^e\right) \quad (8)$$

where $d_k$ is a column vector comprising elements $d_k^{i,m}$ and $L_k^e$ is the extrinsic information column vector representing a priori log likelihood ratio (LLR) values for the bits from MAP decoder 309. The extrinsic information (the a priori LLR vector $L_k^e$) is exchanged between MIMO demapper 305 and MAP decoder 309 to improve the bit error rate performance for each iteration. The elements of the a priori LLR vector $L_k^e$ may be independent variables in the interleaved bit stream.

For the first iteration (i.e., the first pass through the iterative detection and decoding process), the elements of the a priori LLR vector $L_k^e$ are set to zero. For each subsequent iteration, the elements of the a priori LLR vector $L_k^e$ are derived from the MAP decoding process of MAP decoder 309.

Returning to FIG. 3, the estimates of bits in F parallel streams from MIMO demapper 305 are provided to parallel-to-serial converter 307 which reconstitutes receiver 300's estimate of the BICM encoded bitstream generated by the transmitter. The estimated BICM encoded bitstream is then deinterleaved by bit deinterleaver 308 and applied to MAP decoder 309 to reverse the convolutional encoding applied by the transmitter.

The MAP decoding process generates soft output values for transmitted information bits. The MAP decoding process employs input a priori LLR values for decoding. The input a priori LLR values to MAP decoder 309 are extrinsic information from MIMO demapper 305, which is the difference between 1) the input LLR values $L_k^e$ to MIMO demapper 305 for the encoded information bits and 2) the output LLR values $L_k$ having elements $L(d_k^{i,m})$ calculated from equation (7) for the estimates for encoded information bits. For MAP decoding, the a posteriori log-likelihood ratio (LLR) value $L(u_i)$ for a user's bit $u_i$ at time i (for either a decoded or a new/improved encoded information bit) given an observation (channel output sample) $y_i$ may be calculated as given in equation (9):

$$L(u_i) = \log\left(\frac{p(u_i = +1 \mid y_i)}{p(u_i = -1 \mid y_i)}\right). \quad (9)$$

The a priori LLR vector $L_k^e$ applied to the kth subchannel MIMO demapper 401(k) of FIG. 4 is formed from extrinsic information of MAP decoding. Extrinsic information for a bit is defined as the difference between 1) the input a priori LLR value to MAP decoder 309 for the encoded information bit (extrinsic information from the MIMO demapper) and 2) the output a posteriori LLR value for the encoded information bit (e.g., generated through equation (9)). However, after forming the difference, the extrinsic information from MAP decoder 309 is first applied to bit interleaver 310. Bit interleaving aligns elements of the extrinsic information with the interleaved estimated BICM encoded bitstream from MIMO demapper 305. In addition, the interleaved extrinsic information is applied to serial-to-parallel converter 311, which forms $N_t$ parallel streams of extrinsic information corresponding to the parallel bit streams formed at the transmitter. Vector channel module 306 then forms the a priori LLR column vector $L_k^e$ for each of the F subchannels from the $N_t$ parallel streams of extrinsic information.

The extrinsic information is exchanged between MIMO demapper 305 and MAP decoder 309 to improve the bit error rate performance for each iteration. The elements of the a priori LLR vector $L_k^e$ may be considered as independent variables in the interleaved bit stream.

However, for calculation of the LLR value of equation (7), the cardinality of the set $S_d^{i,m}$ is $2^{N_t M}$. Thus, $2^{N_t M}$ sequence evaluations are made. The number of evaluations grows exponentially with the product of the number of transmit antennas $N_t$ and the number of bits per constellation symbol (signal point) M. To improve speed of decoding and decrease both circuit size and power consumption of an implementation, it is desirable to reduce the number of calculations during the evaluations. For a first level of complexity reduction without significant loss of performance, a Max-Log approximation for calculation of LLRs may be used in both a MIMO demapper and in a MAP decoder for the convolutional code. The Max-Log approximation for calculation of a posteriori LLR values may employ the max* term relationship of equation (10):

$$\max{}^*(x, y) = \log(e^{-x} + e^{-y}) = \max(x, y) + \log(1 + e^{-|x-y|}) \quad (10)$$

when calculating updated forward recursive, reverse recursive, and branch metrics sequences to calculate the value of equation (6). Each constituent MIMO demapper or MAP decoder thus calculates the max* term by separate calculation of a max term (max(x,y)) and a logarithmic correction term $(\log(1+e^{-|x-y|}))$.

A system operating in accordance with an embodiment of the present invention may provide the following advantages. Space time bit-interleaved coded modulation (ST-BICM) in wireless LAN applications is flexible in various system configurations. Unlike other space-time coded systems of the prior art in which coding and modulation design was specified for each system setup, a single coder in a ST-BICM system operating in accordance with an exemplary embodiment of the present invention may support many different data rates. Support of multiple, varying data rates may be advantageous for wireless LAN system design where, for example, eight different data rate modes are defined in the 802.11a standard.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method of processing data for transmission through a channel, the method comprising the steps of:
   (a) applying coded modulation to the data to generate an encoded bitstream;
   (b) forming at least two parallel streams from the encoded bitstream;
   (c) modulating each parallel stream to form a corresponding sequence of frequency domain symbols; and
   (d) transforming, for each parallel stream, F frequency domain symbols into F subchannels, wherein F is an integer greater than 1.

2. The invention of claim 1, further comprising the step of:
   (e) transferring, for each parallel stream, the F subchannels to the channel.

3. The invention of claim 1, wherein step (a) comprises the steps of:
   (a1) applying a convolutional code to the data; and
   (a2) interleaving the data to form the encoded bitstream.

4. The invention of claim 1, wherein step (b) forms the at least two parallel streams via a serial-to-parallel conversion.

5. The invention of claim 1, wherein step (c) modulates each parallel stream to form frequency domain symbols of a multi-level, m-ary signal-point constellation, wherein m is an integer greater than 1.

6. The invention of claim 1, wherein step (d) transforms F frequency domain symbols into F subchannels by the step of applying a Fourier transform to the F frequency domain symbols.

7. The invention of claim 1, wherein steps (c) and (d) apply orthogonal frequency domain multiplexing (OFDM) to the parallel streams.

8. The invention of claim 1, wherein the method is embodied in a processor of a wideband wireless communication transmitter.

9. A method of generating data from two or more groups of F subchannels, the method comprising the steps of:
  (a) applying a subchannel of each group to a corresponding multi-input, multi-output (MIMO) demapper;
  (b) generating, by each MIMO demapper, 1) a corresponding estimate of two or more parallel streams and 2) likelihood information based on extrinsic information;
  (c) combining the estimates of the two or more parallel streams into an estimate of an encoded bitstream; and
  (d) decoding the estimate of the encoded bitstream based on the likelihood information, wherein the decoding generates the extrinsic information.

10. The invention of claim 9, further comprising the step of repeating steps (b) through (d) to iteratively decode the estimate of the encoded bitstream into the data.

11. The invention of claim 9, wherein step (d) decodes user data encoded by the steps of applying a convolutional code to the data and interleaving the data to form the encoded bitstream.

12. The invention of claim 9, wherein, for step (b) the likelihood information is generated by the step of evaluating the expression:

$$\log\frac{P(d_k^{i,m}=+1\mid y_k,H_k)}{P(d_k^{i,m}=-1\mid y_k,H_k)} = \log\frac{\sum_{x_k\in S_{+1}^{i,m}} p(x_k,y_k,H_k)}{\sum_{x_k\in S_{-1}^{i,m}} p(x_k,y_k,H_k)},$$

with $$p(x_k, y_k, H_k) \propto \exp\left(-\frac{1}{N_0}\|y_k - H_k x_k\|^2 + \frac{1}{2}d_k^T L_k^e\right)$$

where $d_k$ is a column vector comprising elements $d_k^{i,m}$, $d^{i,m}$ being the bit that is mapped at the kth subchannel (k=1, 2, ..., F) into the mth bit position (m=1, 2..., M) of a constellation symbol of an ith transmit antenna (i=1, 2, ..., $N_t$), $L_k^e$ is the extrinsic information column vector representing a priori log likelihood ratio (LLR) values for the bits from MAP decoding a transmitted vector of symbol bits $x_k$, $y_k$ is a vector of observations at the receiver, and $H_k$ is a channel function.

13. The invention of claim 9, wherein step (d) comprises the steps of:
  (d1) deinterleaving the encoded bit stream;
  (d2) applying maximum a posteriori (MAP) decoding to the deinterleaved encoded bitstream;
  (d3) generating reliability information for the encoded bitstream;
  (d4) interleaving the reliability information; and
  (d5) forming the extrinsic information from interleaved reliability information.

14. The invention of claim 9, wherein the F subchannels for the encoded bitstream are formed by the steps of:
  (e) applying coded modulation to the data to generate the encoded bitstream;
  (f) forming at least two parallel streams from the encoded bitstream;
  (g) modulating each parallel stream to form a corresponding sequence of frequency domain symbols; and
  (h) transforming, for each parallel steam, F frequency domain symbols into F subchannels, wherein F is an integer greater than 1.

15. The invention of claim 9, wherein the method is embodied in a processor of a wideband wireless communication receiver.

16. Apparatus for processing data for transmission through a channel, the apparatus comprising:
  an encoder configured to apply coded modulation to the data to generate an encoded bitstream;
  a serial-to-parallel converter configured to form at least two parallel streams from the encoded bitstream;
  a modulator configured to modulate each parallel stream into a corresponding sequence of frequency domain symbols; and
  a transform module configured to transform, for each parallel steam, F frequency domain symbols into F subchannels, wherein F is an integer greater than 1.

17. The invention of claim 16, further comprising at least two antennas configured to transfer, for each parallel steam, the F subchannels to the channel.

18. The invention of claim 16, wherein the encoder comprises:
  a convolutional encoder that applies a convolutional code to the data; and
  an interleaver configured to interleave the data to form the encoded bitstream.

19. The invention of claim 16, wherein the modulator modulates each parallel stream to form frequency domain symbols of a multi-level, m-ary signal-point constellation, wherein m is an integer greater than 1.

20. The invention of claim 16, wherein the transform module is subband coding module.

21. The invention of claim 16, wherein the transform module is configured to transform F frequency domain symbols into F subchannels by applying a Fourier transform to the F frequency domain symbols.

22. The invention of claim 16, wherein the modulator and transform module apply orthogonal frequency domain multiplexing (OFDM) to the parallel streams.

23. The invention of claim 16, wherein the apparatus is embodied in a wideband wireless communication transmitter.

24. The invention of claim 16, wherein the apparatus is embodied in an integrated circuit.

25. Apparatus for generating data from two or more groups of F subchannels, the apparatus comprising:
  a multi-input, multi-output (MIMO) demapper configured to generate, based on the two or more groups of F subchannels, 1) a corresponding estimate of two or more parallel streams and 2) 2) likelihood information based on extrinsic information;
  a parallel-to-serial converter configured to combine the estimates of the two or more parallel streams into an estimate of an encoded bitstream; and a decoder configured to decode the estimate of the encoded bitstream based on the likelihood information, wherein the decoder generates the extrinsic information.

26. The invention of claim 25, wherein the MIMO demapper and the decoder are configured to iteratively decode the estimate of the encoded bitstream into the data.

27. The invention of claim 25, wherein step (d) decodes user data encoded by the steps of applying a convolutional code to the data and interleaving the data to form the encoded bitstream.

28. The invention of claim 25, wherein, for the MIMO demapper, the likelihood information is generated by the step of evaluating the expression:

$$\log \frac{P(d_k^{i,m} = +1 \mid y_k, H_k)}{P(d_k^{i,m} = -1 \mid y_k, H_k)} = \log \frac{\sum_{x_k \in s_{+1}^{i,m}} p(x_k, y_k, H_k)}{\sum_{x_k \in s_{-1}^{i,m}} p(x_k, y_k, H_k)},$$

with $$p(x_k, y_k, H_k) \propto \exp\left(-\frac{1}{N_0}\|y_k - H_k x_k\|^2 + \frac{1}{2} d_k^T L_k^e\right)$$

where $d_k$ is a column vector comprising elements $d_k^{i,m}$, $d^{i,m}$ being the bit that is mapped at the kth subchannel (k=1, 2, ..., F) into the mth bit position (m=1, 2..., M) of a constellation symbol of an ith transmit antenna (i=1, 2, ..., $N_t$), $L_k^e$ is the extrinsic information column vector representing a priori log likelihood ratio (LLR) values for the bits from MAP decoding a transmitted vector of symbol bits $x_k$, $y_k$ is a vector of observations at the receiver, and $H_k$ is a channel function.

29. The invention of claim 25, wherein the decoder comprises:
a deinterleaver configured to deinterleaving the encoded bit stream;
a maximum a posteriori (MAP) decoder configured to apply MAP decoding to the deinterleaved encoded bitstream and configures to generate reliability information for the encoded bitstream;
an interleaver configured to interleave the reliability information; and
means for forming the extrinsic information from interleaved reliability information.

30. The invention of claim 25, wherein the F subchannels for the encoded bitstream are formed by:

(A) applying coded modulation to the data to generate the encoded bitstream;
(B) forming at least two parallel streams from the encoded bitstream;
(C) modulating each parallel stream to form a corresponding sequence of frequency domain symbols; and
(D) transforming, for each parallel steam, F frequency domain symbols into F subchannels, wherein F is an integer greater than 1.

31. The invention of claim 25, wherein the apparatus is embodied in a processor of a wideband wireless communication receiver.

32. The invention of claim 25, wherein the apparatus is embodied in an integrated circuit.

33. A computer-readable medium having stored thereon a plurality of instructions, the plurality of instructions including instructions which, when executed by a processor, cause the processor to implement a method for processing data for transmission through a channel, the method comprising the steps of:

(a) applying coded modulation to the data to generate an encoded bitstream;
(b) forming at least two parallel streams from the encoded bitstream;
(c) modulating each parallel stream to form a corresponding sequence of frequency domain symbols; and
(d) transforming, for each parallel steam, F frequency domain symbols into F subchannels, wherein F is an integer greater than 1.

34. A computer-readable medium having stored thereon a plurality of instructions, the plurality of instructions including instructions which, when executed by a processor, cause the processor to implement a method for generating data from two or more groups of F subchannels, the method comprising the steps of:

(a) applying a subchannel of each group to a corresponding multi-input, multi-output (MIMO) demapper;
(b) generating, by each MIMO demapper, 1) a corresponding estimate of two or more parallel streams and 2) likelihood information based on extrinsic information;
(c) combining the estimates of the two or more parallel streams into an estimate of an encoded bitstream; and
(d) decoding the estimate of the encoded bitstream based on the likelihood information, wherein the decoding generates the extrinsic information.

* * * * *

UNITED STATES PATENT AND TRADEMARK OFFICE
CERTIFICATE OF CORRECTION

PATENT NO. : 7,359,313 B2
APPLICATION NO. : 10/178923
DATED : April 15, 2008
INVENTOR(S) : Albert Chan, Inkyu Lee and Carl-Erik Wilhelm Sundberg It is certified that error appears in the above-identified patent and that said Letters Patent is hereby corrected as shown below:

In Column 9, on line 52, replace "$d^{ki, m}$" with -- $d_k^{i,m}$ --.

In Column 9, on line 55, replace "$L_k^e$" with -- $L_k^e$ --.

In Column 10, on line 63, replace "2) 2)" with --2)--.

In Column 11, on line 28, replace "$d^{ki, m}$" with -- $d_k^{i,m}$ --.

In Column 11, on line 31, replace "$L_k^e$" with -- $L_k^e$ --.

Signed and Sealed this

Seventeenth Day of February, 2009

JOHN DOLL
*Acting Director of the United States Patent and Trademark Office*